United States Patent
Arunkumar et al.

(10) Patent No.: US 10,673,864 B2
(45) Date of Patent: *Jun. 2, 2020

(54) LOCATION VERIFICATION VIA A TRUSTED USER

(71) Applicant: International Business Machines Corporation, Armonk, NY (US)

(72) Inventors: Saritha Arunkumar, Hursley (GB); Kuntal Dey, New Delhi (IN); Nizar Lethif, Yorktown Heights, NY (US); Enara C. Vijil, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/399,476

(22) Filed: Apr. 30, 2019

(65) Prior Publication Data

US 2019/0260759 A1 Aug. 22, 2019

Related U.S. Application Data

(63) Continuation of application No. 15/415,318, filed on Jan. 25, 2017, now Pat. No. 10,375,083.

(51) Int. Cl.
*H04L 29/06* (2006.01)
*H04W 4/02* (2018.01)
(Continued)

(52) U.S. Cl.
CPC .......... *H04L 63/107* (2013.01); *H04W 4/023* (2013.01); *H04W 12/08* (2013.01); *H04W 12/00503* (2019.01)

(58) Field of Classification Search
None
See application file for complete search history.

(56) References Cited

U.S. PATENT DOCUMENTS 8,561,142 B1 * 10/2013 Sobel ...................... G06F 21/00
709/203
9,305,298 B2 * 4/2016 Wilson ................... G06Q 20/42
(Continued)

FOREIGN PATENT DOCUMENTS

WO  WO 2012/141972 A1  9/2016

OTHER PUBLICATIONS

United States Notice of Allowance dated Mar. 26, 2019 in U.S. Appl. No. 15/415,318.
(Continued)

*Primary Examiner* — Shin-Hon (Eric) Chen
(74) *Attorney, Agent, or Firm* — Anthony Curro, Esq.; McGinn I.P. Law Group, PLLC.

(57) ABSTRACT

A computer-implemented information verification method, system, and computer program product, include verifying a user device is within a proximity of a second device to grant access for the user device to a service available at a second location with the second device, where a trusted user operating the second device attests to a user device location of the user device so that the user of the user device accesses the service available only to users in the second device location of the trusted user independently of activities on the second device.

4 Claims, 5 Drawing Sheets

(51) Int. Cl.
*H04W 12/08* (2009.01)
*H04W 12/00* (2009.01)

(56) References Cited

U.S. PATENT DOCUMENTS

| | | | | |
|---|---|---|---|---|
| 9,401,915 B2* | 7/2016 | DeWeese | | H04L 63/0428 |
| 2007/0015463 A1* | 1/2007 | Abel | | H04B 5/0031 |
| | | | | 455/41.1 |
| 2010/0205316 A1* | 8/2010 | Xue | | H04L 63/062 |
| | | | | 709/229 |
| 2012/0142378 A1* | 6/2012 | Kim | | H04N 21/41407 |
| | | | | 455/456.6 |
| 2012/0227092 A1* | 9/2012 | Smith | | G06F 21/42 |
| | | | | 726/4 |
| 2012/0309416 A1* | 12/2012 | Whelan | | G01S 5/0205 |
| | | | | 455/456.1 |
| 2014/0096215 A1* | 4/2014 | Hessler | | H04L 63/0869 |
| | | | | 726/7 |
| 2014/0310764 A1* | 10/2014 | Tippett | | G06F 21/31 |
| | | | | 726/1 |
| 2014/0313862 A1* | 10/2014 | Rahimi | | G08C 23/02 |
| | | | | 367/199 |
| 2014/0324591 A1* | 10/2014 | Kim | | H04W 12/06 |
| | | | | 705/14.58 |
| 2015/0237052 A1* | 8/2015 | Brique | | H04L 63/10 |
| | | | | 726/1 |
| 2015/0244699 A1* | 8/2015 | Hessler | | G06F 21/44 |
| | | | | 726/7 |
| 2016/0005003 A1* | 1/2016 | Norris | | G06Q 10/10 |
| | | | | 705/7.19 |
| 2016/0055324 A1* | 2/2016 | Agarwal | | G06F 21/31 |
| | | | | 726/17 |
| 2016/0057117 A1* | 2/2016 | Balasingh | | H04L 9/30 |
| | | | | 713/171 |
| 2016/0174025 A1* | 6/2016 | Chaudhri | | H04B 1/385 |
| | | | | 455/41.1 |
| 2016/0188853 A1* | 6/2016 | Smith | | G06F 21/53 |
| | | | | 726/19 |
| 2016/0323393 A1* | 11/2016 | Umphreys | | H04L 67/18 |
| 2017/0006009 A1* | 1/2017 | Hessler | | G06F 21/10 |
| 2017/0085565 A1* | 3/2017 | Sheller | | H04L 63/0876 |
| 2017/0142378 A1 | 5/2017 | Terada | | |
| 2017/0164190 A1* | 6/2017 | Weksler | | H04W 12/06 |
| 2018/0041492 A1* | 2/2018 | Jacobs | | H04W 4/029 |
| 2018/0077569 A1* | 3/2018 | Chao | | H04W 12/06 |
| 2018/0191695 A1* | 7/2018 | Lindemann | | H04L 63/0853 |

OTHER PUBLICATIONS

United States Office Action dated Jan. 25, 2019, in U.S. Appl. No. 15/415,318.
United States Office Action dated Nov. 28, 2018, in U.S. Appl. No. 15/415,318.
United States Office Action dated Oct. 15, 2018, in U.S. Appl. No. 15/415,318.
Mel, et al. "The NIST Definition of Cloud Computing". Recommendations of the National Institute of Standards and Technology. Nov. 16, 2015.

* cited by examiner

LOCATION VERIFICATION VIA A TRUSTED USER

CROSS-REFERENCE TO RELATED APPLICATIONS

The present application is a Continuation Application of U.S. patent application Ser. No. 15/415,318, filed on Jan. 25, 2017, the entire contents of which are hereby incorporated by reference.

BACKGROUND

The present invention relates generally to a location verification method, and more particularly, but not by way of limitation, to a system, method, and computer program product for verifying a location of a device based on comparing a measurement from the user device location with a measurement from a second device location to determine whether the user device location is within a threshold proximity of the second device to grant access for the user device to the second device.

Handheld (portable) devices send a location of a device based on a Global Positioning System (GPS) coordinates signal. However, these coordinates can be "faked" (or mis-represented) by an owner (or another user) of the device if required to gain access to an access point that requires a location verification.

Conventionally, access to specific resources can be given based on an identification and a location of the user. The user is typically given a device that can send a location (e.g., based on GPS coordinates). This, along with the credentials of the user is used to verify that a user is at a particular location. Thus, a two-tier security measure is in place. However, unless the device is tamper-resistant, the owner (or a third party) can fake the location of the device. Global attestation procedure is a way of making the job of a malicious user difficult by validating credentials from surrounding devices called "Brokers". For example, access to a server can be guaranteed only if the user's device is connected to the office network through Wifi. In this case, the access point reports that the user is physically connected to the office network and hence is likely inside the office (or at least nearby).

Thus, the needs in the art include a location verification technique that is not susceptible to location spoofing due to the one-way verification required from the device-to-server verification.

SUMMARY

In an exemplary embodiment, the present invention can provide a computer-implemented information verification method, the method including acquiring a first measurement from a user device specific to a user device location, acquiring a second measurement from a second device specific to a second device location, comparing the first measurement with the second measurement, and verifying the user device is within a proximity of the second device to grant access for the user device to the second device, based on a result of the comparing.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
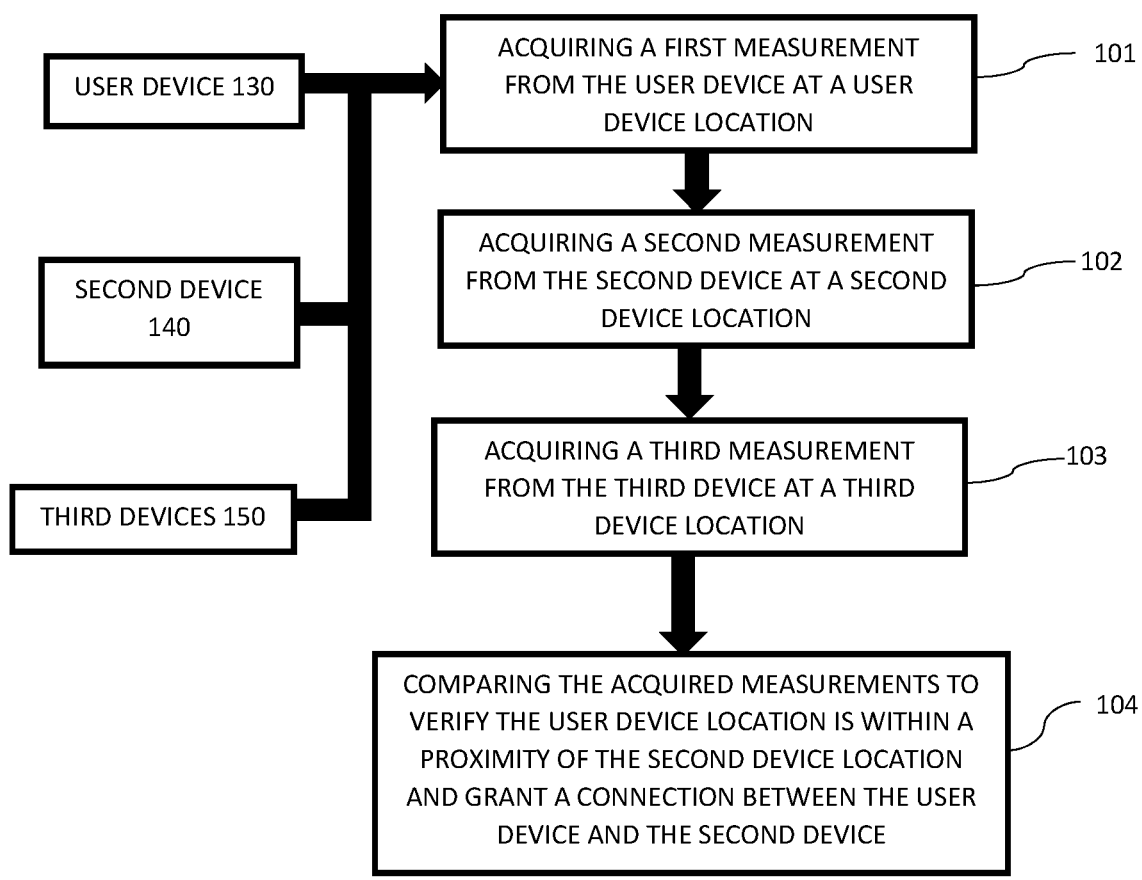
FIG. 1 depicts a high-level flow chart for a location verification method according to an embodiment of the present invention.

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, a location verification method 100 according to an embodiment of the present invention includes various steps to measure and compare a type of measurement unique to the location of the user and the second device in order to grant access to the second device for the user. As shown in at least FIG. 3, one or more computers of a computer system 12 according to an embodiment of the present invention can include a memory 28 having instructions stored in a storage system to perform the steps of FIG. 1.

Thus, a location verification method 100 according to an embodiment of the present invention may act in a more sophisticated and useful fashion, and in a cognitive manner while giving the impression of cognitive mental abilities and processes related to knowledge, attention, memory, judgment and evaluation, reasoning, and advanced computation. That is, a system is the to be "cognitive" if it possesses macro-scale properties—perception, goal-oriented behavior, learning/memory and action—that characterize systems (i.e., humans) that are generally agreed as cognitive.

Figure 3:
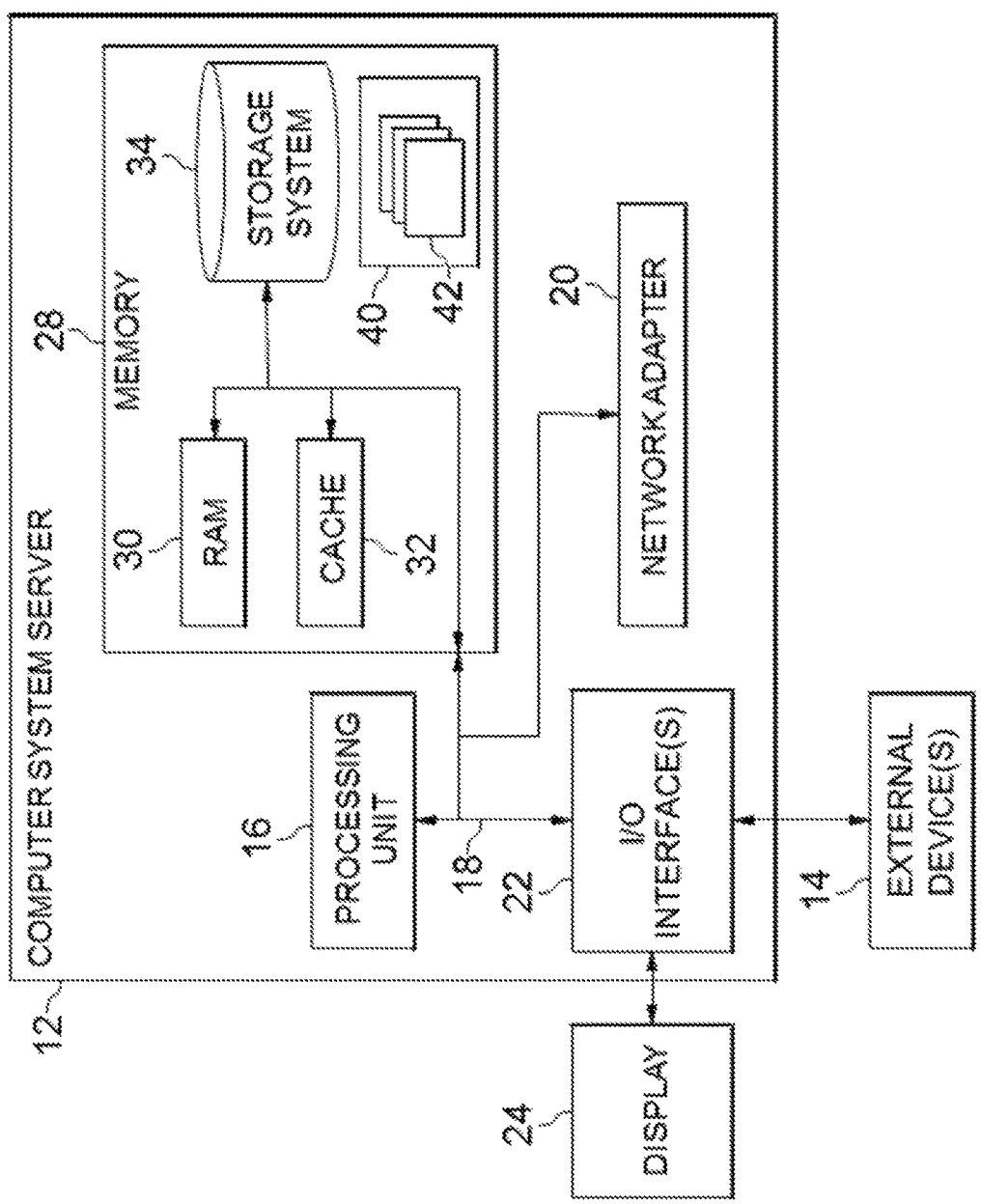
FIG. 3 depicts a cloud computing node according to an embodiment of the present invention.
Figure 4:
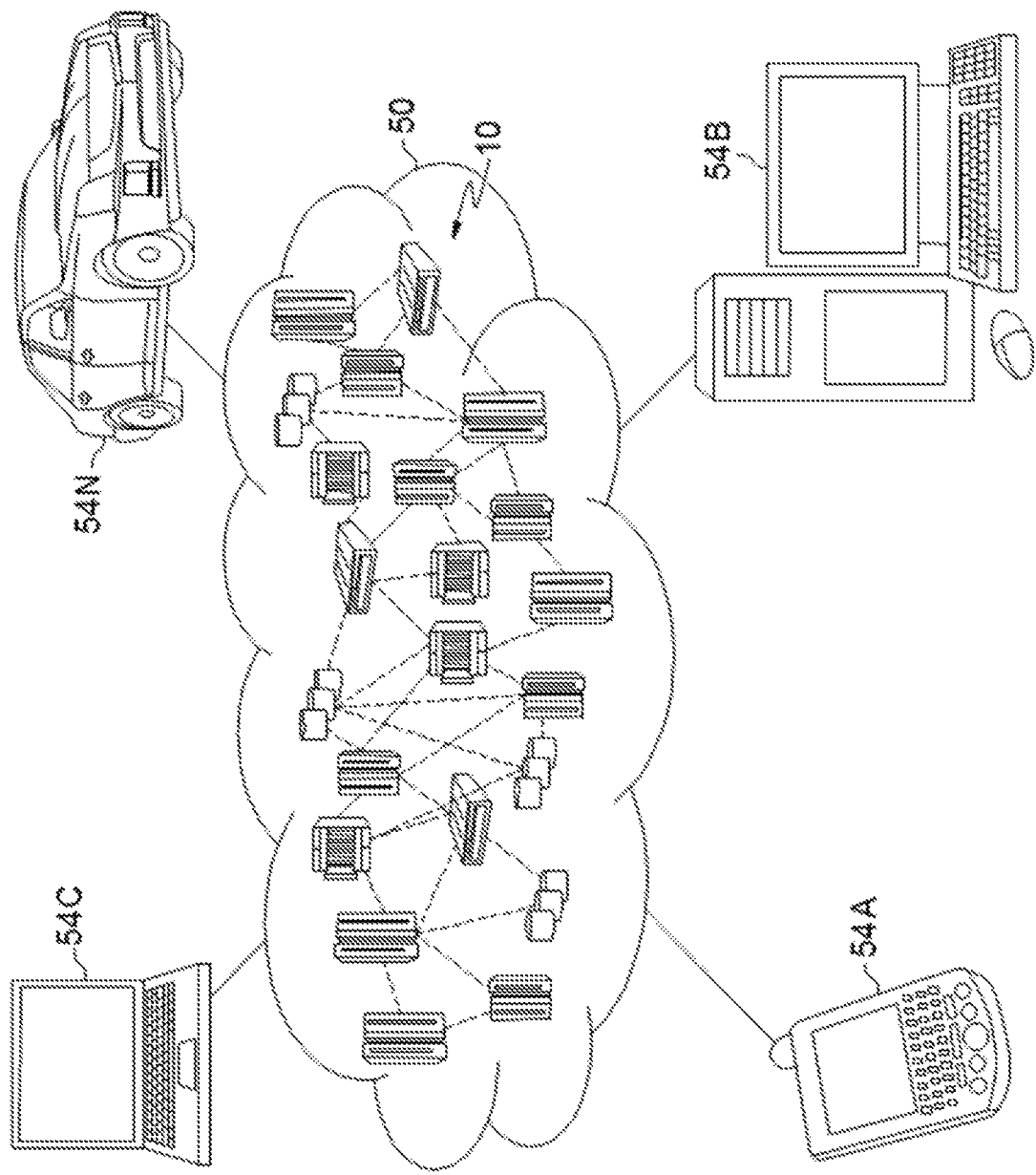
FIG. 4 depicts a cloud computing environment according to an embodiment of the present invention.

As will described/illustrated herein, one or more embodiments of the present invention (see e.g., FIGS. 3-5) may be implemented in a cloud environment 50 (see e.g., FIG. 4). It is nonetheless understood that the present invention can be implemented outside of the cloud environment.

It is noted that the measurements acquired below are measurements specific to the location of the device. For example, in an exemplary embodiment, temperature is acquired at the location of the device.

Referring now to FIG. 1, in step 101 a first measurement is acquired from the user device 130 at the user device location. The first measurement can include an audio clip that is acquired using recording technology installed on the user device 130. In another embodiment, the measurement can include, for example, weather parameters (e.g., humidity, temperature, precipitation, etc.), light exposure (e.g., sun light or unnatural light) or amount thereof, barometric pressure, air quality, a video clip, and an oxygen value in the air (e.g., oxygen value can vary with altitude) acquired using various sensors on the user device 130. Contributions of any of the above may also be used.

That is, the first measurement is acquired to indicate a location-specific parameter to the user device 130 (i.e., a first measurement unique to the location of the user device 130 and not a "spoofed" measurement). It is noted that metadata and metadata history can be used to acquire different measurements of the user device 130. For example, temperature may commonly be the same in most rooms (i.e., room temperature). However, metadata history from the last time the user was outside can be used in order to acquire a temperature value of the user that is "location-specific" and compared with a temperature value from a trusted source. Similarly, a video can be captured prior to the connection request between the user device 130 and the second device indicating that the user device 130 is entering a building where the second device resides.

In step 102, a second measurement from a second device 140 (i.e., a device with which the user wants to connect ("pair")) at a second device location is acquired.

That is, the second measurement is acquired from the second device location to indicate a location-specific parameter of the second device 140. It is noted that the second measurement is the same as the first measurement such that the values can be compared (as described later). In some embodiments, the user device 130 and the second device 140 communicate capabilities of the devices in order to acquire a first and a second measurement such that both devices may have installed a sensor capable of measuring the parameters. For example, the measurements will not be a video clip if the user device 130 does not include a video camera.

In step 103, a third measurement is acquired from one or more nearby (other) third devices 150 at a third device location. In step 103, the measurement is preferably acquired from the perspective of the one or more (other) third devices 150 (e.g., a third device in which the user is not requesting to pair, but can also be compared to the measurement of the user device location). In some embodiments, all third devices 150 (other than the second device 140) which are in proximity (e.g., within a predetermined distance) acquire the same measurement as the second measurement and the first measurement. In some embodiments, the third devices 150 can acquire a different measurement than the second measurement to compare with a different first measurement to provide a higher level of security for granting access (i.e., the first measurement and second measurement can be temperature and the different first measurement and the third measurement can be an audio clip).

In step 104, the first measurement from the user device location and the second measurement from the second device location are compared and a difference (if any) between the first measurement and the second measurement is quantified. If the difference is less than a predetermined threshold, then the location of user device 130 can be considered as verified (i.e., the user device location is within a proximity of the second device location).

In step 104, the comparison of the first measurement can be expanded to include a comparison with one or more (or each) of the third measurements from the third device 150. In one embodiment, the location verification can include a comparison and determination of whether the first measurement is also within a predetermined threshold of the third measurement associated with a single third device 150 selected from among one or more multiple third device(s) 150 at the alleged location. In some embodiments, the location verification can require that the first measurement also be within a predetermined threshold difference of multiple third measurements associated with corresponding multiple third device(s) 150 at the alleged location. In some embodiments, multiple third measurements are averaged (e.g., the ambient sound in all the audio clips) and the comparison with the first measurement is performed against such average to identify whether the result is within a predetermined threshold (i.e., whether the ambient sound of the audio clip recorded by the first device is within a predetermined threshold of matching the ambient sound of the third devices).

Step 104 performs the comparison to verify if the user device 130 is at a specific location because the first measurement, the second measurement, and the third measurement will be within a predetermined threshold if the user is at the location specified (e.g., the user is not faking ("spoofing") a location of the user device 130).

Figure 2:
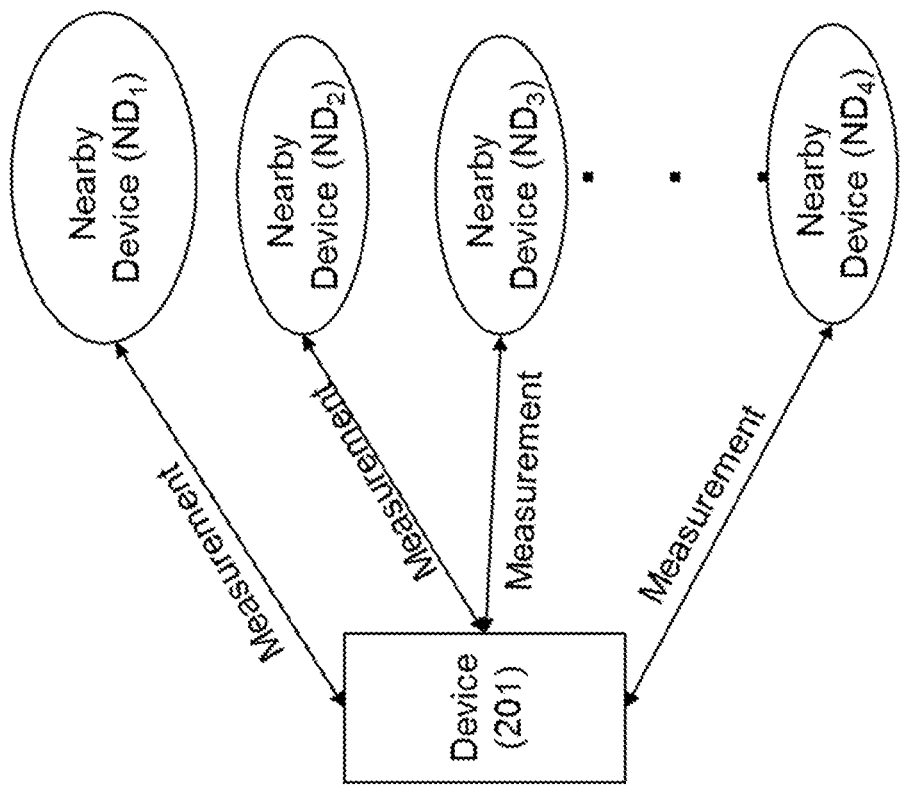
FIG. 2 depicts a user device to a plurality of other devices measurements being compared according to an embodiment of the present invention.

For example, a list of devices nearby which can corroborate a location of the user device is detected and the user device and the nearby devices record an audio clip (e.g., acquire a first measurement and a second measurement) in which are compared and then a score is computed to determine how similar these clips are (e.g., a lower score indicating the audio clips are similar and hence possibly the devices are near as shown in FIG. 2 in the "measurement table 200")

Such verification can take into account device characteristics, noise levels, environment/terrain, etc. at the location. The allowable differences between the measurements can also be varied based on a given device's characteristics and/or the known environment at the location. Also, the host of the connection (e.g., the host of the second device) can set thresholds for a difference between the first measurement and the second measurement.

FIG. 2 exemplarily shows an embodiment of the present invention in which steps 101, 102, and 103 (FIG. 1) acquire measurements from the device 201 (i.e., the user device) and various nearby device $ND_{1-n}$. The "measurements table 200" shows the results of Step 104 when the measurement is an audio clip. For example, the ambient noise of the audio clip acquired by $ND_2$ is most similar to the audio clip acquired by the device 201 (e.g., 2.4 score difference). Depending on the threshold value set by the grantor of access, if 2.4 is less than the threshold value, access is granted. Similarly, an average of the ambient noise of the audio clips acquired by devices $ND_n$ and the device 201 is 10.2. If the threshold is, for example, 5, access is denied because it is likely that the device 201 is not in a location nearby the device trying to be connected to because the difference between the ambient noise of the audio clip of the device 201 and the nearby devices $ND_n$ is greater than the threshold value.

Thus, a two-way verification can be provided in which a value detected by a user device is compared with a value detected by a second device (e.g., the device to which the user wishes to connect) in order to authorize the connection between the two devices.

Exemplary Hardware Aspects Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 3, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
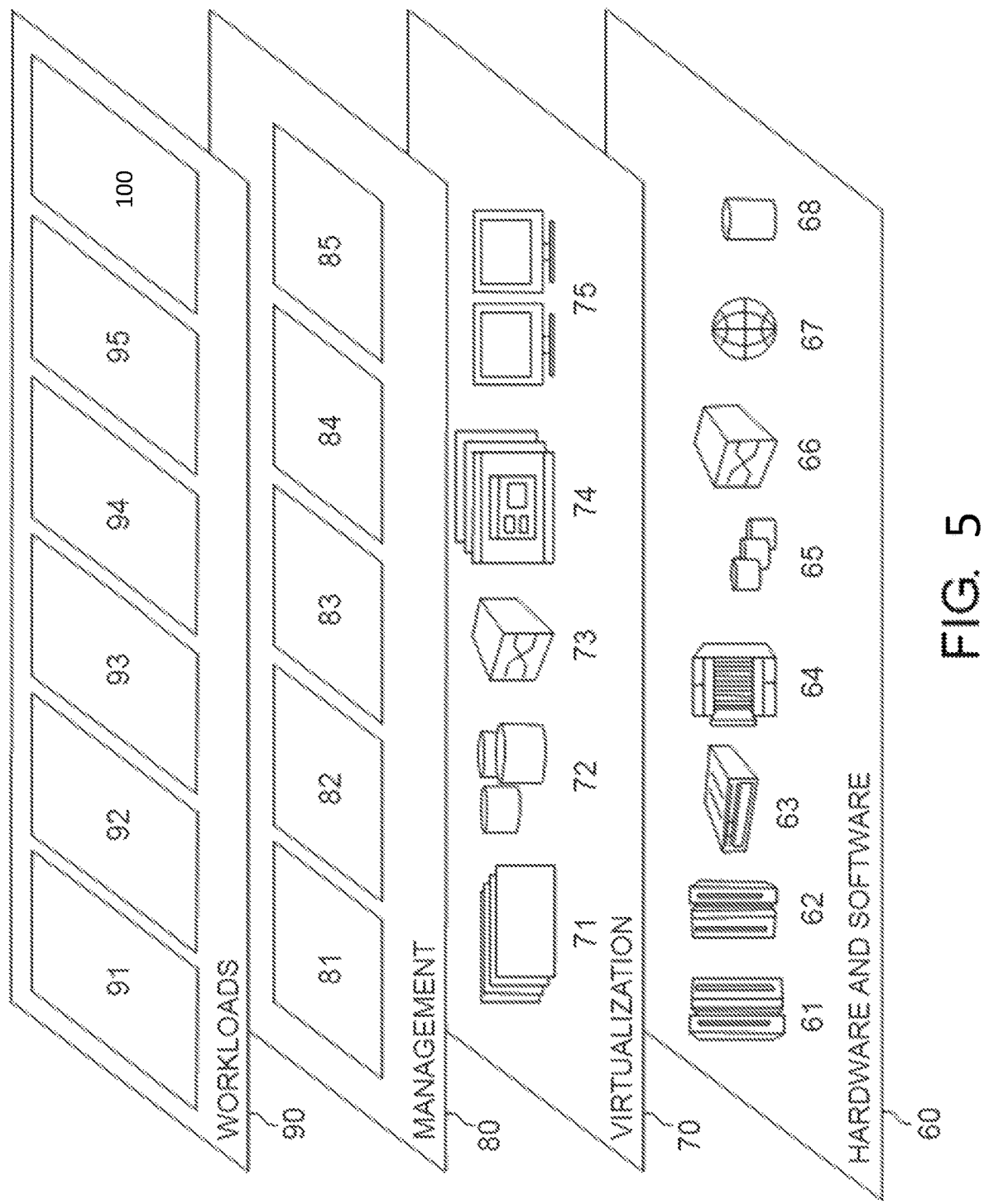
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the location verification method 100.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented information verification method, the method comprising:
   verifying a user device is within a proximity of a second device to grant access for the user device to a service available at a second location with the second device, wherein a trusted user operating the second device attests, separately from the verifying by a computer, to a user device location of the user device so that the user of the user device accesses the service available only to users in the second device location of the trusted user independently of activities on the second device.

2. The computer-implemented claim 1, wherein a user of the user device is different than the trusted user operating the second device.

3. A computer program product for location verification, the computer program product comprising a non-transitory computer-readable storage medium having program instructions embodied therewith, the program instructions executable by a computer to cause the computer to perform:
   verifying a user device is within a proximity of a second device to grant access for the user device to a service available at a second location with the second device, wherein a trusted user operating the second device attests, separately from the verifying by a computer, to a user device location of the user device so that the user of the user device accesses the service available only to users in the second device location of the trusted user independently of activities on the second device.

4. A location verification system, the system comprising:
   a processor; and
   a memory, the memory storing instructions to cause the processor to perform:
      verifying a user device is within a proximity of a second device to grant access for the user device to a service available at a second location with the second device, wherein a trusted user operating the second device attests, separately from the verifying by a computer, to a user device location of the user device so that the user of the user device accesses the service available only to users in the second device location of the trusted user independently of activities on the second device.

\* \* \* \* \*